Feb. 26, 1963  E. B. GRAVES  3,079,526
ENERGY TRANSLATING DEVICE
Filed March 25, 1958

INVENTOR.
EDWARD B. GRAVES
BY
Bates, Teare & McBean
ATTORNEYS

United States Patent Office 3,079,526
Patented Feb. 26, 1963

3,079,526
ENERGY TRANSLATING DEVICE
Edward B. Graves, South Euclid, Ohio, assignor to Picker-X-Ray Corporation, Waite Manufacturing Div. Inc., Cleveland, Ohio, a corporation of Ohio
Filed Mar. 25, 1958, Ser. No. 723,909
8 Claims. (Cl. 321—27)

The present invention relates in general to an energy translating device in the form of a combined transformer and rectifier arrangement for converting alternating current of a given voltage to unidirectional current of the same or different voltage.

It is known that rectification of alternating current may be accomplished by the use of rectifying material in combination with electrical energy conductive material, which permits the current to flow substantially in one direction only. One of such known rectifying materials is selenium.

The present invention is particularly adapted for use in X-ray or fluoroscopy art where high voltages and unidirectional current are utilized in the activation of X-ray emitting devices. Heretofore in such art, the transformation and rectification of current generally required the use of two separate devices, namely a transformer to develop the proper voltage required and a rectifier to control the direction of flow of the transformed current. In the embodiment of the present invention as illustrated, a deposit of selenium is used on one end of a flat strip of aluminum and a plurality of such strips are connected in series to form a long ribbon of aluminum with intermittent deposits of the selenium rectifying material. The ribbon of aluminum strips and intermittent selenium deposits is then wound in a form of a coil for use as a secondary winding of a transformer, thus providing a transformer arrangement which will not only vary the voltage level but will also allow current to pass easily in one direction, but substantially stopping the current flow in the opposite direction. As is known in the art, the method of making the selenium deposit substantially governs the amount of voltage which can be rectified and the area of the selenium determines the amount of current that will be passed.

Therefore, an object of the invention is to provide an energy translating device or transformer with a secondary winding which will perform the dual functions of acting as a rectifier, while at the same time fulfilling its normal function as a transformer secondary winding.

Another object of the invention is to provide a device of the latter mentioned type which can be effectively used in the X-ray art and fluoroscopy art to develop the proper voltage required and to control the directional flow of the transformed current to an external load.

Another object of the invention is to provide a transformer with a secondary winding comprising a series of connected aluminum strips of metal with intermediate deposits of selenium rectifying material, the combination being wound in the form of a coil which will perform the dual functions of acting as a rectifier while at the same time fulfilling its normal function as a transformer secondary winding.

Other features and advantages of the invention will be apparent from the consideration of the following description taken in conjunction with the accompanying drawings wherein.

Figure 1:
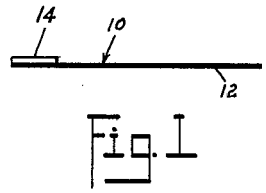
FIG. 1 is a side elevational view of a strip of aluminum with a deposit of selenium rectifying material on one end thereof.
Figure 2:
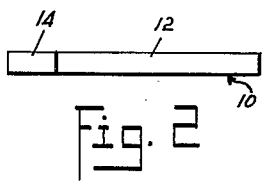
FIG. 2 is a top plan view of the FIG. 1 arrangement.
Figure 3:
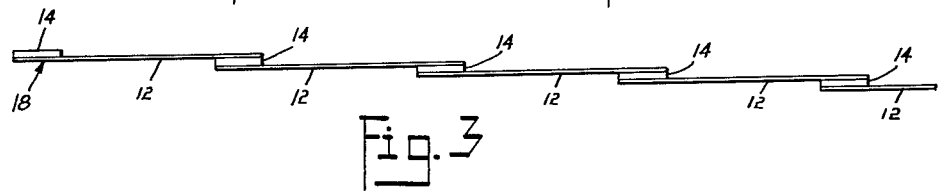
FIG. 3 is a side elevational view of a plurality of the strips of FIG. 1 connected in series to form a ribbon of aluminum strips with intermediate selenium deposits.
Figure 4:
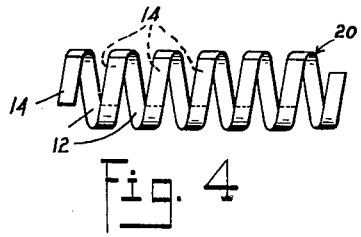
FIG. 4 illustrates the FIG. 3 arrangement wound in the form of a coil for use as the secondary of a transformer.
Figure 5:
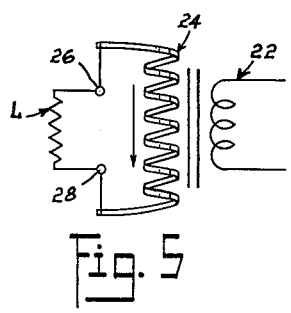
FIG. 5 is a generally diagrammatic illustration of a transformer-rectifier arrangement embodying the present invention.

Referring again to the drawings, in FIGS. 1 and 2, in the embodiment of the invention illustrated, there is shown a rectifier element 10 comprising a strip of electrical energy conducting material 12, such as a strip of aluminum, with a deposit of selenium rectifying material 14 disposed on one end of a face of the aluminum strip. As an example, a strip of aluminum ½ inch wide by 6 inches long and .010 inch thick could be utilized as the strip element. The selenium deposit secured to the end of the strip 12 may be produced in any well known manner with the area of the selenium generally determining the amount of current that will be passed in one direction. A plurality of the rectifier strip elements 10 are cemented or otherwise held together (cementing compounds and methods for accomplishing the desired result being well known in the art) to form a comparatively long ribbon 18, consisting of the strip rectifier elements 10 in series and as illustrated in FIG. 3 of the drawing. The ribbon 18 may be wound in the form of a helix or coil 20 (FIG. 4) for use as the secondary in a transformer device. The present invention may be used in any suitable type of transformer, such as an iron-core type, powdered iron-core type, or air-core type, but in FIG. 5 of the drawings it has been shown, for purposes of illustration, as an iron-core type of transformer, which is the type generally used in connection with X-ray and fluoroscopy apparatus.

The transformer comprises a primary coil 22 and a secondary winding 24. The primary coil 22 may be of any conventional form, and the secondary winding 24 consists of the laminate strip rectifier coil of the invention. It will be seen that one strip rectifier element may form each turn of the coil 24. In connecting the secondary winding 24 to a load L, one end of the winding is connected to one output terminal 26, while the opposite end of the winding is connected to another output terminal 28. When alternating current is supplied to primary coil 22, which may be connected to suitable supply mains, the secondary winding 24 will pass current in only one direction—as for instance as illustrated by the arrow in FIG. 5—due to the intermediate deposits 14 of the selenium rectifying material, thereby providing in one unit a transformer which will produce unidirectional current at the desired voltage.

Figure 6:
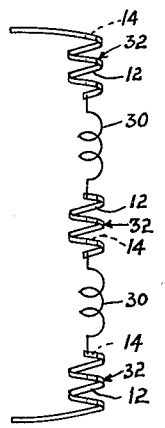
FIG. 6 is a generally diagrammatic illustration of a secondary transformer-rectifier coil arrangement in accordance with the invention, with interposed wire coils in series with a plurality of the transformer-rectifier coils, to increase the voltage rating of the transformer.

The usual voltage rating of a single cell selenium rectifier is approximately 30 volts. This would mean that a transformer would need to be wound with this voltage per turn of winding. In most cases this would be a little impractical, especially as concerns X-ray apparatus. Accordingly, in order to increase the voltage rating of the secondary winding of the transformer of the invention, a number of turns of copper wire or coils 30 (FIG. 6) may be connected in series with a suitable number of transformer-rectifier coils 32 of the aforedescribed construction to increase the output voltage rating of the transformer. With such an arrangement, the secondary winding can be wound for any desired voltage, as for instance an average of 100,000 volts, the latter representing a value generally applicable to X-ray and fluoroscopy apparatus.

Figure 7:
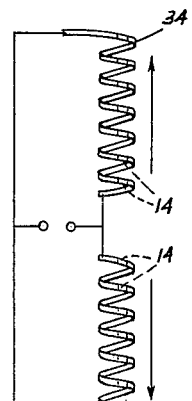
FIG. 7 is a secondary transformer-rectifier coil arrangement for obtaining full wave rectification.

Referring to FIG. 7 of the drawings, a double rectifier coil arrangement is illustrated for use as a secondary in a transformer and adapted for full wave rectification. The transformer-rectifier coils heretofore described are half-way rectifiers, or in other words the output of current occurs during only one-half cycle of the alternating current. Full-wave rectification may be provided in one transformer-rectifier by using two secondary windings connected so that they are operative alternately, to produce a continuous current output. Such a full-way transformer-rectifier arrangement is shown in FIG. 7 wherein the secondary windings 34 and 36 are provided. These secondary windings are formed similarly to that illustrated in FIG. 5 of the drawings, with coil 34 being wound with the deposits of rectifier material reversed from those of coil 36. The ends of the coils are electrically connected together, as shown, and one coil, for instance coil 34, will pass one-half of the alternating current in the direction illustrated by the arrow and the other coil (i.e. coil 36) will pass the other half of the alternating current in the direction illustrated by its associated arrow, to therefore obtain substantially a full-wave voltage from such a combination.

Figure 8:
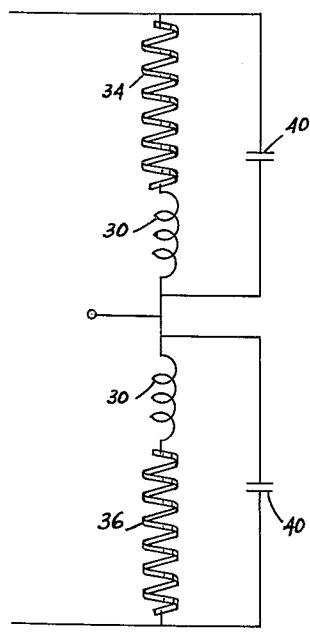
FIG. 8 is a secondary transformer-rectifier coil arrangement of generally a combination of the FIGS. 6 and 7 arrangements but including capacitors which act as smoothing condensers for full wave rectification.

In FIG. 8 there is illustrated a full-wave transformer-rectifier arrangement which includes capacitors (or condensers) 40 as well as the aforementioned type of voltage increasing coils 30, the connected ends of which may be grounded. Capacitors 40 are of predetermined capacity for accomplishment of the results desired and are adapted to act as smoothing condensers for the full-wave rectification developed in the coils of the secondary winding illustrated. Each of the condensers 40 may be provided by a set of spaced plates insulated from one another and disposed on the exterior of the rectifier and voltage step-up coils 34, 36 and 30 respectively, and connected in parallel with the latter as shown.

The number of turns in the transformer-rectifier coils (i.e. coils 32, 34), and in the wire coils (i.e. coils 30), and the wire gage, and the value of the smoothing condensers (i.e. condensers 40) will be determined by the output voltage and current desired in the particular environmental setting in which the transformer-rectifier device or winding is adapted for use, along with a consideration of the type of core structure, if any, utilized. As an example of a transformer embodying the present invention for providing an output of 100,000 volts, the wire used in the voltage step-up coils may comprise No. 30 wire, this being sufficient to carry a momentary maximum load of 500 milliamperes for a period of ¼ second for this loading, and the capacitors used may have a value of .33 microfarad.

From the foregoing description and accompanying drawings it will be seen that the invention provides a novel electrical energy translating device or transformer which combines transformer and rectifying elements into one composite arrangement for effectively converting alternating current of a given voltage to unidirectional current of the same or different voltage. The invention also provides an arrangement of the latter mentioned type which is particularly adapted for use in connection with X-ray, radiography, and fluorosocopy apparatus.

The terms and expressions which have been employed are used as terms of description and not of limitation, and there is no intention in the use of such terms and expressions of excluding any equivalents of any of the features described or portions thereof but it is recognized that various modifications are possible within the scope of the invention claimed.

I claim:

1. An electrical energy translating device adapted for use in X-ray apparatus and the like comprising, a first coil forming the primary circuit of the device and a second winding physically separated from but electromagnetically coupled to said first coil, said second winding comprising elongated flat strips of an electrical energy conducting material electrically connected to one another at the ends thereof by spaced deposits of rectifying material with such strips and spaced deposits of said rectifying material being wound into coil form to provide a plurality of electrically conducting coil turns, each having a series connected rectifying portion, whereby the current induced in said second winding can flow in one direction only.

2. In an electrical energy translating device in accordance with claim 1 wherein said strips of electrical energy conducting material consist of aluminum and said deposits of rectifying material consist of selenium.

3. In an electrical energy translating device in accordance with claim 1 wherein at least one auxiliary coil of electrical energy conducting material is electrically connected in series to said second winding to increase the voltage rating of the latter.

4. A secondary coil for a transformer of a type adapted for use in an X-ray apparatus and the like, said coil having a spirally shaped configuration and comprising a plurality of elongated flat strips of electrical energy conducting material and electrically connected to one another in generally end-to-end relation by spaced deposits of rectifying material, each of said strips and an associated deposit of rectifying material respectively forming a single turn of the coil having a series connected rectifying portion.

5. A full-wave transformer-rectifier unit adapted for use in X-ray apparatus and the like and comprising a primary winding, a core therefor, and two secondary windings, each secondary winding comprising a plurality of elongated flat strips of electrical energy conducting material electrically connected to one another in generally end-to-end relation by spaced deposits of rectifying material and wound into coil form, each of said strips and associated deposits of rectifying material respectively forming a single turn having a series connected rectifying portion in the respective windings, said rectifying deposits on one of said secondary windings being reversely deposited from those on the other of said secondary windings and the respective ends of said secondary windings being electrically connected to one another to provide full-wave rectification and a substantially continuous current output.

6. In a magnetic coupling having a primary coil adapted to induce a voltage in a secondary coil, a secondary coil coupled thereto and comprising, a discontinuous electrical conductor having a plurality of independent conductors disposed in end-to-end relation and means in the form of deposits of rectifying material respectively interconnecting adjacent ends of successive conductors to form a continuous conducting member, said continuous member being wound in coil form with each independent conductor forming a separate turn of said coil and providing a plurality of electrically conducting coil turns each connected in series relation to successive turns through an associated rectifying material deposit to provide a uni-directional electrical output across the secondary coil.

7. A full-wave rectifier in accordance with claim 5 wherein auxiliary coils of electrical energy conducting material are electrically coupled in series with each of said second windings and wherein condensers are electrically connected in parallel with said auxiliary coils and said secondary windings for smoothing the full-wave rectification developed therein, said condensers being disposed on the exterior of the respective windings.

8. An inductive winding including a plurality of turns, each turn consisting of alternate conductive and rectifier elements connected in series to form said inductive winding.

References Cited in the file of this patent
UNITED STATES PATENTS

| | | |
|---|---|---|
| 2,546,736 | Fry et al. | Mar. 27, 1951 |
| 2,564,881 | Cronshey et al. | Aug. 21, 1951 |